United States Patent
Chang

[19]

[11] Patent Number: 6,153,277
[45] Date of Patent: Nov. 28, 2000

[54] DEVICE OUTER WALL STRUCTURE

[76] Inventor: Kwei-Lin Chang, No. 10, Lane 100, Dong Kwang Yuan Street, Taichung, Taiwan

[21] Appl. No.: 09/124,119

[22] Filed: Jul. 29, 1998

[51] Int. Cl.[7] .............................. B29D 22/00; B62J 1/26; B62K 21/26
[52] U.S. Cl. ......................... 428/35.2; 428/178; 297/199; 74/551.9; 16/430
[58] Field of Search .................................... 428/156, 172, 428/174, 178, 76, 35.2, 35.7, 36.9, 72, 188; 297/195.1, 199, 215.16; 74/557, 551.9; 16/110.1, 430; 81/489

[56] References Cited

U.S. PATENT DOCUMENTS

| | | | |
|---|---|---|---|
| 4,096,306 | 6/1978 | Larson | 428/178 |
| 4,422,194 | 12/1983 | Viesturs et al. | 5/451 |
| 4,869,939 | 9/1989 | Santo . | |

*Primary Examiner*—Donald Loney
*Attorney, Agent, or Firm*—Dougherty & Troxell

[57] ABSTRACT

A device outer wall structure includes a rubber covering covered on a device for example a bicycle hand grip or saddle, the rubber covering having a plurality of hollow convex portions filled with air and a plurality of air passages in communication between the convex portions for guiding air from one convex portion to another when the convex portions bear an external pressure.

3 Claims, 3 Drawing Sheets

DEVICE OUTER WALL STRUCTURE

BACKGROUND AND SUMMARY OF THE INVENTION

The present invention relates to a device outer wall structure, and more specifically to the rubber covering of a bicycle or motorcycle's hand grip or saddle which effectively buffers the pressure from the user and massages the contact part of the user.

Regular bicycle or motorcycle's hand grips are commonly molded from hard plastics, having an embossed or grooved outside wall for positive gripping by hand. This hard hand grip design is not comfortable in use. When the hand moves over the hand grip, much friction force is produced, causing the skin of the hand to be hurt.

The present invention has been accomplished to provide a device outer wall structure which eliminates the aforesaid problems. According to the present invention, the device which can be a hand grip or saddle is covered with a rubber covering, which has air-filled hollow convex portions that communicate with one another. The compressible air-filled hollow convex portions enable the hand grip to be positively held in hand. When the user holds the hand grip or sits on the saddle, air flows from one air-filled portion to another to simultaneously massage the user's hands or hips.

DETAILED DESCRIPTION OF THE PREFERRED EMBODIMENT

Figure 1:
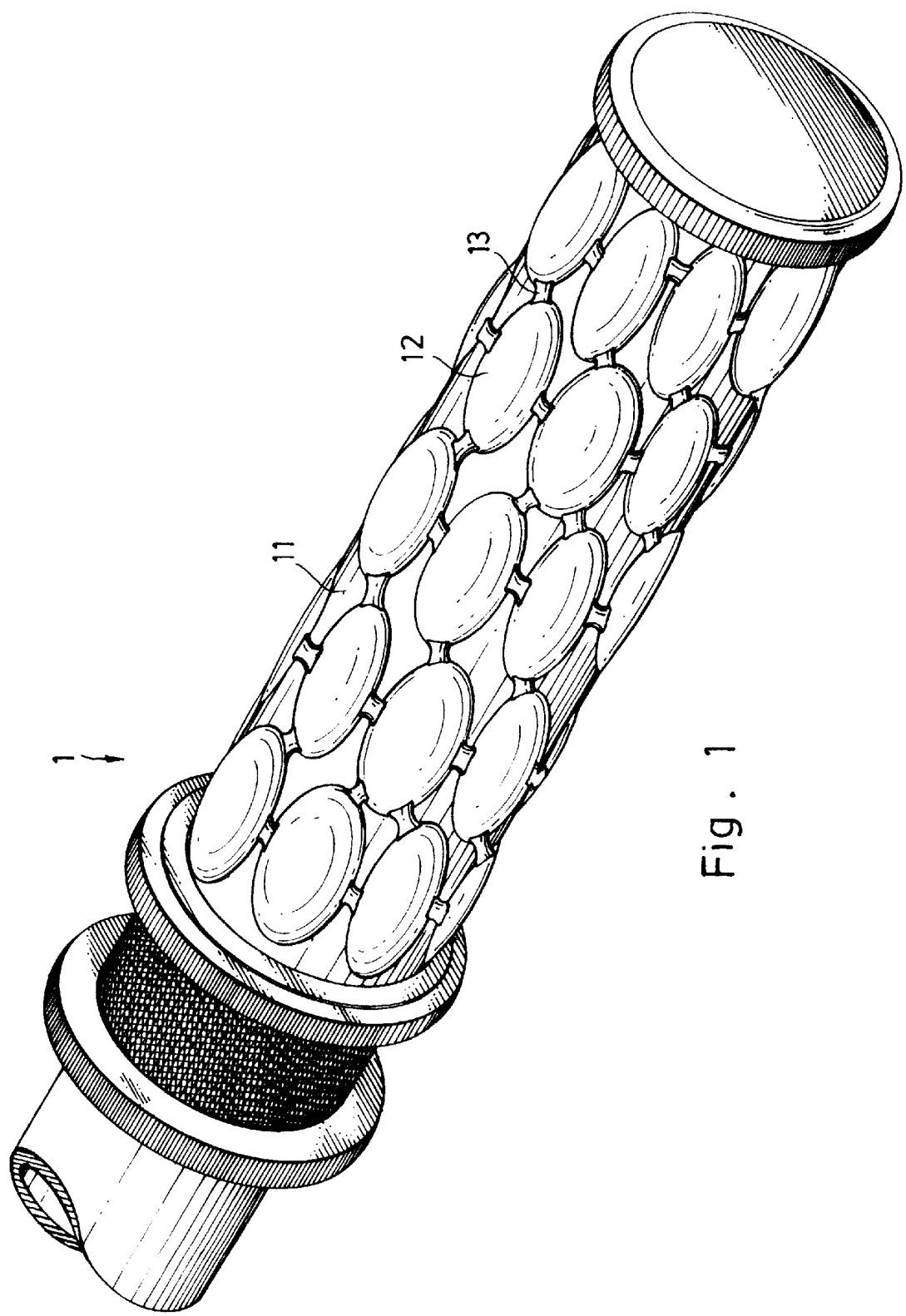
FIG. 1 is a perspective view of bicycle hand grip constructed according to the present invention.
Figure 2:
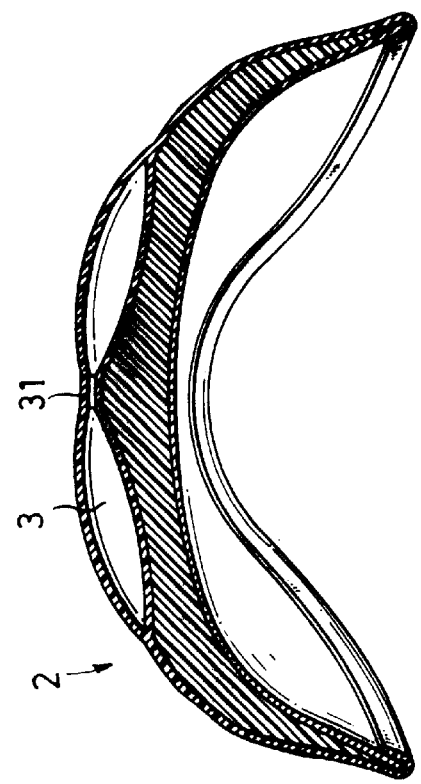
FIG. 2 is a cross sectional view of the bicycle hand grip shown in FIG. 1.

Referring to FIGS. 1 and 2, the bicycle hand grip 1 comprises a rubber outer wall 11 having a plurality of hollow convex portions 12 and a plurality of air passages 13 in communication between the convex portions 12. The hollow convex portions 12 are filled with air. When gripping hand grips, the hollow convex portions 12 which are held firmly in the hand is compressed, causing contained air to be forced out the compressed hollow convex portions 12 through the respective air passages 13 to the non-compressed convex portions 12. When the hand moves on the hand grip 1, air flows from on convex portion 12 to another through the air passages 13 to buffer the pressure from the hand.

Figure 4:
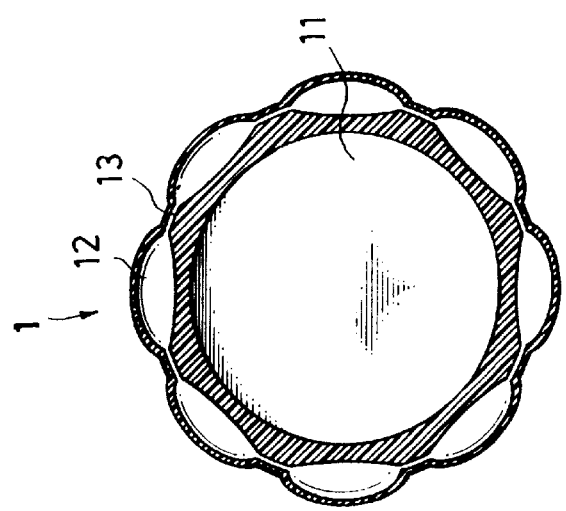
FIG. 4 is a cross sectional view of the bicycle saddle shown in FIG. 3.
Figure 3:
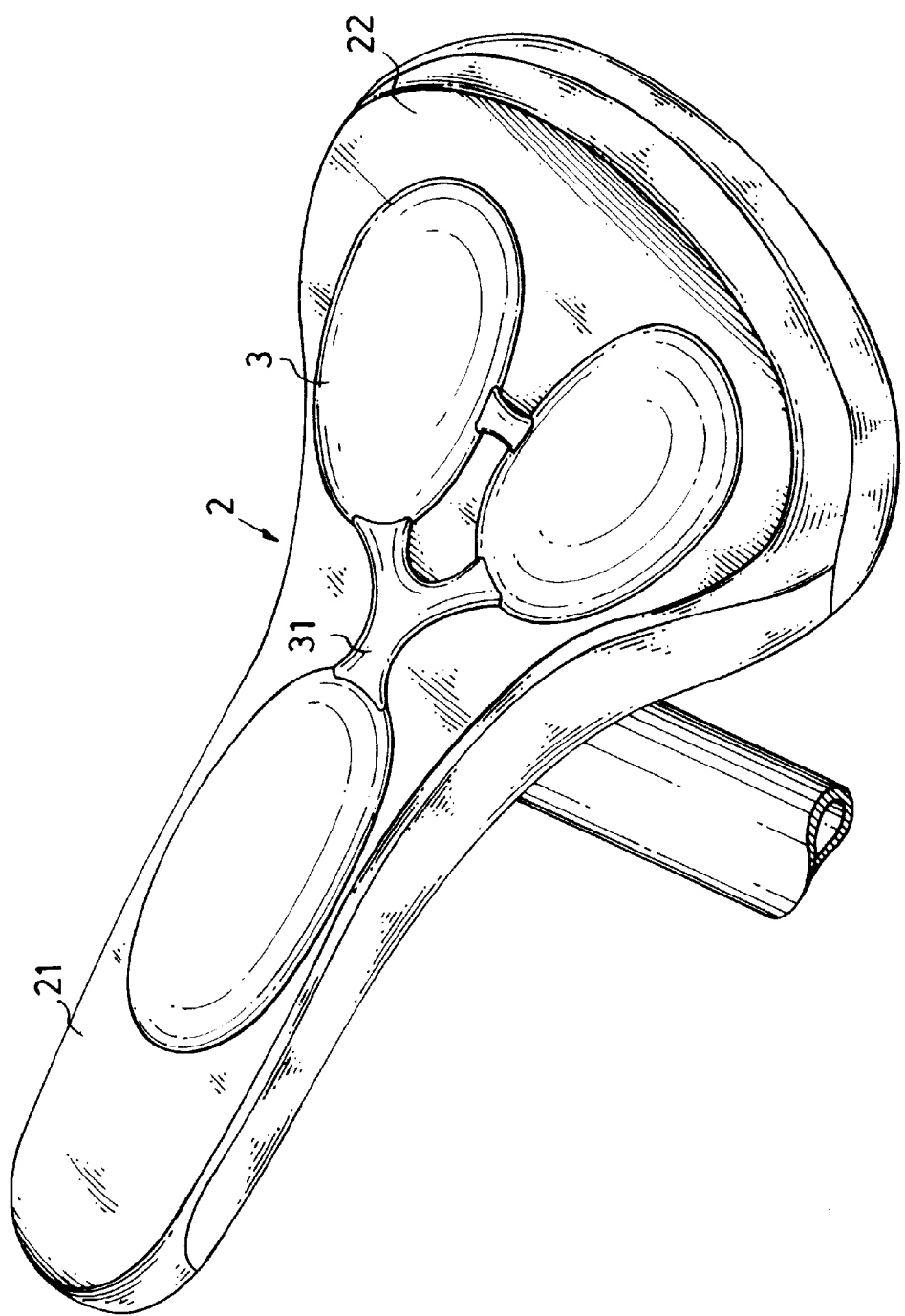
FIG. 3 is a perspective view of a bicycle saddle constructed according to the present invention.

Referring to FIGS. 3 and 4, the bicycle saddle 2 has a wide rear part 22, and a narrow front part 21. Substantially, the bicycle saddle 2 is shaped like a triangle. The rubber covering of the bicycle saddle 2 comprises a plurality of hollow convex portions 3, and a plurality of air passages 31 communication between the convex portions 3. The hollow convex portions 3 are filled with air. The convex portions 3 include one longitudinally arranged at the norrow front part 21, and two arranged in parallel at the wide rear part 22. When the user sits on the bicycle saddle, air is forced to flow from one convex portions 3 to another to buffer the pressure from the rider.

As indicated above, air-filled convex portions 12, 3 are provided at the rubber covering of the hand grip 1 or saddle 2 and arranged in communication with another by air passages 13, 31. When the user sits on or grips the hand grip 1 or saddle 2, air flows from one convex portion 12 or 3 to another to buffer the pressure and to reduce friction force between the hand grip 1 or saddle 2 and the user's skin, causing the user's hand or hips to be massaged. Because the air-filled convex portions 12 are compressible, the hand grip 1 can be positively held in hand.

What is claimed is:

1. A hand grip for a vehicle handlebar, comprising a substantially cylindrical rubber outer wall having a plurality of hollow convex portions extending outwardly from the outer wall, the convex portions containing air, and a plurality of air passages connecting the plurality of convex portions together thereby enabling air to pass between connected convex portions.

2. A saddle for a bicycle comprising: a rear part and a front part, the front part having a lesser width than the rear part; a rubber covering disposed on the front and rear parts of the saddle, the rubber covering having a plurality of hollow convex portions having air therein, and a plurality of air passages interconnecting the plurality of convex portions enabling air to pass between the connected convex portions.

3. The saddle of claim 2 comprising three hollow convex portions, wherein one of the plurality of air passages has a substantially Y-shaped configuration.

* * * * *